: 2,971,012
Patented Feb. 7, 1961

2,971,012

NEW PLASTICIZER-STABILIZER COMPOSITIONS OF MATTER

Hans Wolff, Decatur, Ill., assignor to A. E. Staley Manufacturing Company, Decatur, Ill., a corporation of Delaware No Drawing. Filed June 24, 1958, Ser. No. 744,079

1 Claim. (Cl. 260—348)

This invention relates broadly to new compositions of matter useful as combination plasticizer-stabilizers for resinous products subject to slow release of hydrogen halide and accompanying deterioration during normal conditions of use. More particularly, it relates to reaction products of epoxidized fatty substances with less than stoichiometric proportions of an acid ester of a polycarboxylic acid, characterized by the presence of a beta hydroxy alkyl ester grouping formed by addition of carboxyl group at an oxirane group.

As is known, many plastic or resinous compositions necessarily contain substantial proportions of a plasticizer to provide softness and flexibility. Typical commercial plasticizers for this purpose are dioctyl phthalate, dibutyl phthalate, and tricresyl phosphate. Among the desirable properties of a plasticizer, the more important are compatibility with, or solubility in, the base resinous material, low vapor pressure, and resistance to deterioration under the influence of light, normal use temperature, atmospheric oxygen and moisture.

Articles fabricated from a halogen containing resin such as polyvinyl chloride for example, and plasticized with a conventional plasticizer exhibit satisfactory physical properties initially. Gradually, however, they become dark and brittle. This behavior is not due to evaporation of the plasticizer. Instead, it is due to a slow release of hydrogen chloride from the polyvinyl chloride, a process that is autocatalytic.

The foregoing deterioration of polyvinyl chloride compositions is currently prevented by adding a stabilizer, a scavenger for hydrogen chloride, to the finished product. Among the substances used for this purpose are metallic salts and epoxy compounds. The latter function by chemical addition of hydrogen chloride at the oxirane ring, yielding a chlorohydrin. Several million pounds of epoxidized vegetable oils and other epoxidized fatty acid derivatives are thus consumed annually. The epoxidized fatty substances also function as a primary plasticizer, but only to a moderate extent because of their limited compatibility with the resins.

Although the epoxidized fatty substances are widely used primarily as a stabilizer and secondarily as a plasticizer, they have one defect: their chlorohydrins are relatively incompatible with the resins, thus leading in some instances to darkening and brittleness of the product.

The primary object of this invention is to provide new chemical compounds useful as improved combination plasticizer-stabilizers for hydrogen halide liberating resins in general and polyvinyl chloride in particular.

Another object of the invention is to provide new plasticizer-stabilizers for hydrogen halide liberating resins which are more compatible with the resins than those used heretofore.

Still another object of the invention is to provide new epoxidized plasticizer-stabilizers whose halohydrins are more compatible with hydrogen halide releasing resins than the corresponding halohydrins of epoxidized plasticizer-stabilizers used heretofore.

A further object of the invention is the simplification of the production of plasticized and stabilized resinous products which discolor and become brittle in the absence of a hydrogen halide scavenger.

Additional objects of the invention will become apparent from the following description of the invention.

The foregoing objects are achieved in part by reacting an epoxidized fatty substance with less than the stoichiometric proportion of an acid ester of a polycarboxylic acid, and in part by incorporating a substantial proportion of the reaction product in a hydrogen halide releasing resin.

Preferably, the acid ester is one whose corresponding normal ester is a plasticizer for the resin. Useful results can be obtained, however, in the absence of this condition, subject to the limitations set forth hereinafter.

The reaction product, which may consist of more than one molecular species, contains unreacted oxirane groups and the chemical combination of epoxidized fatty compound with acid ester as a higher molecular weight beta hydroxylated alkyl ester. It thus retains the property of hydrogen halide scavenger and acquires improved properties as a primary plasticizer.

Preferably, also, the starting epoxidized fatty compound contains two or more oxirane groups per molecule. The reaction product will then consist chiefly of one or more molecular species each containing at least one oxirane group and at least one beta hydroxy alkyl ester group. For example, the reaction of four moles of epoxidized soybean oil containing 6.4% by weight of oxirane oxygen (about 4 oxirane groups per glyceride molecule) with one mole of monobutyl phthalate yields chiefly a substituted glyceride containing about 3 oxirane groups and one phthalate ester group per molecule. As pointed out earlier, the carboxyl group of the acid ester adds in normal manner to an oxirane group of the epoxidized fatty compound, yielding a beta hydroxy alkyl ester.

The invention includes, however, the reaction of an epoxidized fatty compound containing only one oxirane group per molecule with a proportion of an acid ester substantially less than that required for stoichiometric reaction of the acid ester carboxyl group with the oxirane group. The reaction product thus obtained will necessarily consist of a mixture of unreacted epoxy compound, union of epoxy compound and acid ester, and possibly some unreacted acid ester. The mixture functions, however, as an improved combination stabilizer and plasticizer for the hydrogen halide liberating resins.

As used herein, the expressions "epoxidized fatty substance" and "epoxidized fatty compound" refer to esters of aliphatic acids wherein the acid group contains from 8 to 22 carbon atoms, and the ester molecule contains at least one oxirane group, preferably in the acid group. The suitable epoxidized compounds may be derived from a wide variety of alcohols and acids. The naturally occurring unsaturated acids are preferred because of their availability and low cost, but synthetic acids can be used successfully. The suitable alcohols include the monohydric aliphatic alcohols such as methyl, ethyl, propyl, butyl, and the like; also the polyhydric aliphatic alcohols such as the glycols, diethylene glycol, glycerol, and the polyglycerols. They also include the aromatic alcohols such as phenol, the aralkyl alcohols such as benzyl alcohol, and the cycloaliphatic alcohols such as cyclohexanol.

Satisfactory acid esters to be reacted with the epoxidized fatty compound according to this invention include those derived from phthalic, adipic, suberic, and sebacic acids. Examples are monobutyl phthalate, mono-2-ethylhexyl phthalate, monoethyl adipate, monoethyl suberate, and monoethyl sebacate. In general, any acid ester of a polycarboxylic acid may be used to advantage, provided it contains at least 8 carbon atoms.

The epoxidized compound and acid ester may be reacted together by heating in the absence of a catalyst.

The following specific examples are preferred embodiments of the invention:

Example 1

A mixture of 100 grams of epoxidized soybean oil (6.4% oxirane oxygen by weight) and 22 grams of monobutyl phthalate was heated at 100° C. for 24 hours. The oxirane oxygen content of the liquid product was 2.7% by weight, the acid number was 2.5, and the refractive index $N_D^{25}$ was 1.4852.

The reaction product was compared with dioctyl phthalate alone and with epoxidized soybean oil alone (6.4% by weight of oxirane oxygen) as stabilizer-plasticizer in films of polyvinyl chloride. Comparisons were made over the range of 10% to 50% stabilizer-plasticizer based on the polyvinyl chloride. At the 30% level and higher, the reaction product surpassed the epoxidized soybean oil with respect to initial flexibility and compatibility as shown by oiliness. At the same levels, the reaction product stabilized the films against discoloration and brittleness as effectively as the epoxidized soybean oil. At all levels of comparison, the reaction product compared favorably with dioctyl phthalate regarding compatibility and initial flexibility, and its stabilizing effect in the aging tests was definitely superior.

Example 2

A mixture of 165 grams of epoxidized soybean oil (6.4% by weight of oxirane oxygen) and 41.7 grams of mono-2-ethylhexyl phthalate was heated at 95° C. for 24 hours. The liquid reaction product had an oxirane oxygen content of 2.96% by weight, an acid number of 2.4 and a refractive index $N_D^{27}$ of 1.4840.

Example 3

A mixture of 100 grams of epoxidized soybean oil (6.4% by weight of oxirane oxygen) and 55.5 grams of mono-2-ethylhexyl phthalate was heated at 95° C. for 24 hours. The liquid reaction product had an oxirane oxygen content of 0.9% by weight and an acid number of 6.

Example 4

A mixture of 300 grams of epoxidized soybean oil (6.4% by weight of oxirane oxygen) and 52.2 grams of monoethyl adipate was heated at 140°–150° C. for 17 hours. The liquid reaction product had an oxirane oxygen content of 2.93% by weight, an acid number of 6, and a refractive index $N_D^{27}$ of 1.4728.

Example 5

A mixture of 200 grams of epoxidized soybean oil (6.4% by weight of oxirane oxygen) and 27.6 grams of 2-ethylhexyl phthalate was heated at 95° C. for 25 hours. The liquid reaction product had an oxirane oxygen content of 4.25% by weight and an acid number of 1.8.

The products of Examples 2, 3, 4, and 5 were compared with epoxidized soybean oil as described in Example 1, and found to be superior to the epoxidized soybean oil as a stabilizer-plasticizer for polyvinyl chloride films.

I claim:

A plasticizer-stabilizer composition consisting of the reaction product of epoxy soybean oil containing about 6.4% by weight of oxirane oxygen with a non-epoxy acid ester selected from the group consisting of monobutyl phthalate, mono-2-ethyl-hexyl phthalate, and monoethyl adipate, the mol proportion of said acid ester to epoxy soybean oil ranging from about 1/2 to 2/1, said reaction product containing from about 0.9% to about 4.3% by weight of oxirane oxygen and having an acid number not exceeding about 6, and said reaction product being obtained by heating the epoxy soybean oil and said acid ester together at a temperature lying within the range of about 95° C. to about 150° C. for a time lying within the range of about 17 hours to about 25 hours.

References Cited in the file of this patent

UNITED STATES PATENTS 2,660,563     Banes                Nov. 24, 1953

OTHER REFERENCES

King: J.C.S. (1943), pages 37 and 38.

UNITED STATES PATENT OFFICE
CERTIFICATE OF CORRECTION

Patent No. 2,971,012            February 7, 1961

Hans Wolff

It is hereby certified that error appears in the above numbered patent requiring correction and that the said Letters Patent should read as corrected below.

Column 4, line 23, beginning with "A plasticizer-stabilizer composition" strike out all to and including "about 25 hours." in line 36, same column 4, and insert instead the followings:

1. A plasticizer-stabilizer composition containing a stabilizing proportion by weight of oxirane oxygen which consists essentially of the reaction product of epoxy soybean oil containing from 2 to 4 oxirane groups per molecule with a non-epoxy acid ester of a dicarboxylic acid selected from the group consisting of phthalic, adipic, suberic, and sebacic acids with an alcohol selected from the class consisting of ethyl, butyl, and 2-ethylhexyl alcohols, the mol ratio of reactants being 1 to 1, said reaction product being obtained by heating said reactants together until esterification of carboxyl groups with oxirane groups reduces the acid number of the reaction product to a value not exceeding about 6.

2. A plasticizer-stabilizer composition containing a stabilizing proportion by weight of oxirane oxygen which consists essentially of the reaction product of epoxy soybean oil containing about 6.4% oxirane oxygen by weight with a non-epoxy acid ester of a dicarboxylic acid selected from the group consisting of phthalic, adipic, suberic, and sebacic acids with an alcohol selected from the class consisting of ethyl, butyl, and 2-ethylhexyl alcohols, the mol ratio of reactants being 1 to 1, said reaction product being obtained by heating said reactants together until esterification of carboxyl groups with oxirane groups reduces the acid number of the reaction product to a value not exceeding about 6.

in the heading to the printed specification, line 8, for "1 Claim." read -- 2 Claims. --.

Signed and sealed this 30th day of June 1964.

(SEAL)
Attest:

ERNEST W. SWIDER            EDWARD J. BRENNER
Attesting Officer            Commissioner of Patents